3,280,135
NOVEL BIS-PYRIDYL-METHYL-DISULFIDE
Gustav Schorre, Darmstadt-Eberstadt, Germany, assignor to E. Merck Aktiengesellschaft, Darmstadt, Germany
No Drawing. Filed Aug. 26, 1964, Ser. No. 392,325
Claims priority, application Germany, Sept. 7, 1963, M 58,115
2 Claims. (Cl. 260—294.8)

This invention relates to a novel bis-pyridyl-methyl-disulfide, its preparation, and its utilization, particularly in the medical field.

An object of this invention is, therefore, to provide a novel bis-pyridyl-methyl-disulfide.

Another object is to provide various processes and intermediates for the manufacture of this disulfide.

Still other objects include pharmaceutical compositions, as well as methods of effecting pharmaceutical activities based on the novel disulfide of this invention.

To achieve these objects, there is provided a novel bis-pyridyl-methyl-disulfide of Formula I

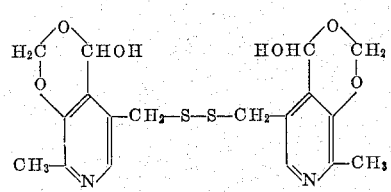

(I)

as well as the acid addition salts and quaternary ammonium salts thereof. These compounds possess important pharmacological properties, and exhibit, for example, analgetic, anticonvulsive, central nervous system-exciting, and emetic effects.

The compound of Formula I can be produced, in a simple manner, by alternative processes, as follows:

(a) Reacting the following compounds with formaldehyde:
Bis-[4-formyl-3-hydroxy-2-methyl-pyridyl-(5)-methyl]-disulfide (pyridoxalyl disulfide) of Formula II

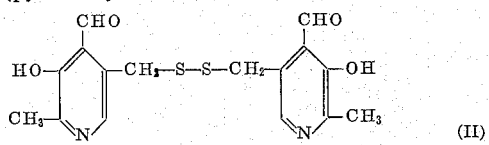

(II)

or its disulfonic acid betaine of Formula IIa

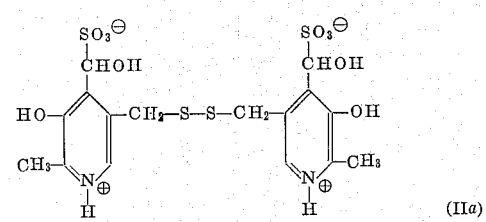

(IIa)

(b) Reacting a 5-halogeno-methyl-2-methyl-pyridine derivative of Formula III with an inorganic disulfide:

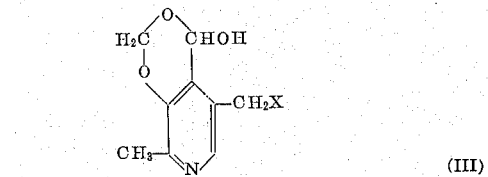

(III)

wherein X=halogen, preferably Cl or Br;

(c) By oxidation of 5,6,7,8-tetrahydro-5-hydroxy-4-mercaptomethyl-1-methyl-6,8-dioxaisoquinoline of Formula IV, which latter compound is produced in situ, if desired:

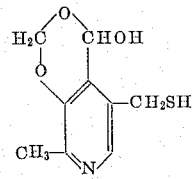

(IV)

(d) Or the compound of Formula I can be converted by conventional methods into acid addition salts or quaternary ammonium compounds thereof.

The preceding reactions are now discussed in detail.

(a) The reaction of the starting products II or IIa, respectively, to form the desired final product can be conducted with formaldehyde in its monomeric form, or in the form of a polymer, for example as trioxymethylene or as paraformaldehyde. Suitably, the reaction is conducted in the presence of water and, if desired, in the presence of an additional, inert solvent, such as, for example, tetrahydrofuran.

The reaction temperatures range preferably between about 10 and 100° C., the use of a temperature of approximately 70° C. being particularly advantageous. It is suitable to stir or to agitate the reaction mixture during the reaction. The rate (velocity) of reaction depends in each individual case on the concentration of reactants, the reaction temperature, and the stirring speed, the reaction being normally completely after one-half to several hours. It is particularly advantageous to heat the starting products II or IIa at about 70° C. for a certain amount of time with an aqueous formaldehyde solution. When the reaction mixture is cooled, possibly by diluting the solution with water, or—if compound IIa is the starting material—with an aqueous solution of an alkaline agent, such as sodium bicarbonate, the desired final product is precipitated.

The starting material II can be produced, for example, by oxidation of the corresponding bis-pyridoxolyl-disulfide with manganese dioxide; the starting material IIa can be produced from compound II and sodium bisulfite.

(b) In producing the final product I by starting with compound III, and reacting it with an inorganic disulfide, the preferred disulfides are ammonium disulfide or alkali metal disulfides, especially sodium disulfide. The reaction is advantageously conducted in the presence of an organic solvent, for example a lower alcohol, such as methanol, ethanol, isopropanol, or in the presence of an ether, such as tetrahydrofuran, dioxane, or in the presence of dimethyl formamide. The reaction takes place generally at between about 0° C. and 50° C.; and the reaction time in each individual case depends on the temperature employed, but does not normally exceed several hours.

As a particularly preferred embodiment, the disulfide is suspended in a solvent, and the solution is added, dropwise, to a compound III.

(c) In producing compound I by oxidizing 5,6,7,8-tetrahydro-5-hydroxy-4-mercapto-methyl-1-methyl-6,8 - dioxaisoquinoline which is formed in situ, if desired, preferred oxidation agents being, for example, the following: air, oxygen, ferric salts, such as ferric chloride, iodine, or hydrogen peroxide. This reaction is suitably conducted in the presence of an inert organic solvent, such as methanol, ethanol, tetrahydrofuran, dioxane, or acetone, or also in the presence of mixtures thereof with one another and/or with water. If desired, the reaction mixture can be heated, for example up to the boiling point of the solvent.

It is unnecessary to isolate the mercapto compound. For example, a halogen compound of Formula III can be treated with an alkali hydrogen sulfide or also with hydrogen sulfide in the presence of an alkali base, and subsequently air or oxygen is passed through the reaction mixture, or alternatively, one of the above-mentioned oxidation agents can be added.

(d) For preparing the acid addition salts of compound I, it is preferable to use strong acids, the salts of which are physiologically compatible, for example, mineral acids, such as hydrochloric acid, hydrobromic acid, sulfuric acid, and phosphoric acid; or sulfonic acids, such as aminosulfonic acid, methane sulfonic acid; or organic acids, such as succinic acid, maleic acid, or fumaric acid. A multitude of additional acids will occur to the chemist, reference being directed, for example, to U.S. Patent No. 2,997,475.

For producing quaternary ammonium compounds, the compound of Formula I can be reacted, for example, with alkyl or aralkyl halogenides, such as methyl iodide, ethyl bromide or ethyl iodide, propyl chloride, propyl bromide, or propyl iodide, benzyl chloride or dialkyl sulfates, such as dimethyl sulfate. The alkyl agents preferably contain 1–8 carbon atoms, whereas the aralkyl agents preferably contain 7 to 10 carbon atoms.

A particular advantage of the bis-pyridyl-methyl-disulfide of Formula I is that it is very stable with respect to the effect of acids. It is decomposed only under extreme conditions, for example by boiling with concentrated hydrochloric acid.

The novel compounds can be used by themselves or in a mixture with conventional pharmaceutical excipients. Carriers can include such organic or inorganic substances which are suitable for parenteral, enteral, or topical application, and which do not react with the novel compounds, such as, for example, water, vegetable oils, polyethylene glycols, gelatins, lactose, amylose, magnesium stearate, talcum, Vaseline, cholesterol, etc. For purposes of parenteral application, solutions are particularly employed, preferably oily or aqueous solutions, as well as suspensions, emulsions, or implants. Further, for enteral application, tablets or dragees can be used, whereas for topical application, salves or creams can be employed which are, if desired, sterilized or mixed with auxiliary agents, such as preservatives, stabilizing agents, or wetting agents, or with salts for influencing the osmotic pressure, or with buffers. Also, pharmaceutical preparations can be produced from the novel bis-pyridyl-(3)-methyl-disulfide in conjunction with other effective agents, such as vitamins A, C, and/or E, theophylline derivatives, and/or rutin.

A preferred unit dosage of these novel compounds is between 5 and 500 mg., inclusive. Naturally, effective dosages are always administered.

The new substances are particularly suitable for treating cerebral functional disturbances which, as experience has shown, respond to vitamin $B_6$ therapy; and/or for eliminating vegetative dystonia, as well as for eliminating conditions of anxiety and depressions.

Without further elaboration it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

3 g. of pyridoxalyl disulfide are heated in 15 ml. of a 35% formaldehyde solution for half an hour to 70° C. After cooling, the solution is diluted with water; the resultant precipitate is vacuum filtered, and washed with water. Yield: 3 g. of bis-[5,6,7,8-tetrahydro-5-hydroxy-1 - methyl - 6,8 - dioxa - isoquinolyl - (4) - methyl] - disulfide, melting point 155° C. Melting point of the hydrochloride: 153° C.

EXAMPLE 2

6 g. of pyridoxalyl disulfide disulfonic acid betaine are heated in 15 ml. of a 40% formaldehyde solution to 70° C. until solution is complete. After cooling, the reaction mixture is mixed with a sodium bicarbonate solution; the precipitate is vacuum filtered and washed with water. Yield: 3.1 g. of bis-[5,6,7,8-tetrahydro-5-hydroxy-1-methyl - 6,8 - dioxa - isoquinolyl - (4) - methyl] - disulfide. M.P. 154–155° C.

EXAMPLE 3

A solution of 2 g. of 5,6,7,8-tetrahydro-4-chloromethyl-5-hydroxy-1-methyl-6,8-dioxa-isoquinoline in 15 ml. absolute ethanol is added, dropwise, with stirring, and under cooling with ice water, to a suspension of 0.6 g. of sodium disulfide in 5 ml. absolute ethanol, at 10–15° C., this being done within 10 minutes. After 30 minutes of stirring at room temperature, the solution is heated for 15 minutes to 40–50° C. and subsequently poured into 80 ml. of water. The precipitate which consists of bis-[5,6,7,8 - tetrahydro - 5 - hydroxy - 1 - methyl - 6,8-dioxa - isoquinolyl - (4) - methyl] - disulfide is removed by vacuum filtering, washed with water, and purified by chromatography on neutral aluminum oxide. M.P. 155° C.

The starting material is obtainable as follows: A mixture of 3 g. of 3-chloromethyl-4-formyl-5-hydroxy-6-methylpyridine and 10 cc. of a 40% aqueous formaldehyde solution is heated for 30 minutes to 70° C. After cooling, the obtained 5,6,7,8-tetrahydro-4-chloro-methyl-5-hydroxy-1-methyl-6,8-dioxa-isoquinoline is precipitated by adding a saturated sodium bicarbonate solution. After recrystallization from ethyl acetate, the free base melts at 135° C. The corresponding hydrochloride has, after recrystallization from ethanol/ether, a melting point of 158° C.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A member of the group consisting of a compound of the formula

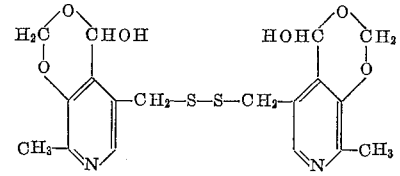

an acid addition salt thereof and a quaternary ammonium compound thereof.

2. Bis - [5,6,7,8 - tetrahydro - 5 - hydroxy - 1 - methyl-6,8-dioxa-isoquinolyl-(4)-methyl]-disulfide.

References Cited by the Examiner

UNITED STATES PATENTS

| 2,510,893 | 6/1950 | Kleiman | 260—294.8 |
| 2,510,894 | 6/1950 | Kleiman | 260—294.8 |
| 2,960,440 | 11/1960 | Jacobson | 167—65 |
| 3,035,976 | 5/1962 | Kimura | 167—65 |

JOHN D. RANDOLPH, *Primary Examiner.*

WALTER A. MODANCE, ALAN L. ROTMAN,
*Assistant Examiners.*